United States Patent [19]

Herrmann

[11] Patent Number: 4,713,501

[45] Date of Patent: Dec. 15, 1987

[54] PARTITIONED SWITCHING PANEL WITH INSERTABLE SWITCHING CARRIAGE AND ADJUSTABLE SHUTTER MECHANISM

[75] Inventor: Johann Herrmann, Regensburg, Fed. Rep. of Germany

[73] Assignee: Sachsenwerk AG, Regensburg, Fed. Rep. of Germany

[21] Appl. No.: 938,720

[22] Filed: Dec. 5, 1986

[30] Foreign Application Priority Data

Dec. 5, 1985 [DE] Fed. Rep. of Germany ....... 3542979

[51] Int. Cl.$^4$ .......................... H01H 9/20; H02B 1/14
[52] U.S. Cl. ................................ 200/50 AA; 361/337; 361/345
[58] Field of Search ................. 200/50 AA; 361/335, 361/336, 337, 338, 339, 343, 344, 345

[56] References Cited

U.S. PATENT DOCUMENTS 1,729,864 10/1929 Brown ................................. 361/337
2,673,260 3/1954 Lester et al. .................. 200/50 AA

FOREIGN PATENT DOCUMENTS 558600 1/1975 Switzerland .
1287821 9/1972 United Kingdom .

Primary Examiner—J. R. Scott
Attorney, Agent, or Firm—Spencer & Frank

[57] ABSTRACT

A partitioned switching panel of the type including a power switch provided with first switch contacts and mounted on a carriage which is movable toward and away from cooperating stationary second switch contacts disposed behind a partition of the switching panel and accessible via openings in the partition, displaceable shutters mounted on the partition for closing the openings, and an opening mechanism for the shutters which is actuated by the carriage drive for opening the shutters before the incoming movement of the carriage from the circuit breaking position to the operating position begins. The carriage drive is provided with an output lever which is rotatably mounted on the carriage and which is provided with a cam follower which, upon energization of the carriage drive to move the carriage to the operating position, traverses a path section in a substantially linear camming track which is fixed in the switching panel, with this path section being ineffective to cause forward movement of the carriage. During such movement, the cam follower simultaneously effects opening of the shutters by engaging a camming lever rotatably mounted on the switching panel. Thereafter, the cam follower traverses the linear camming track twice in opposite directions to effect the forward movement of the carriage into the operating position of the switch.

13 Claims, 9 Drawing Figures

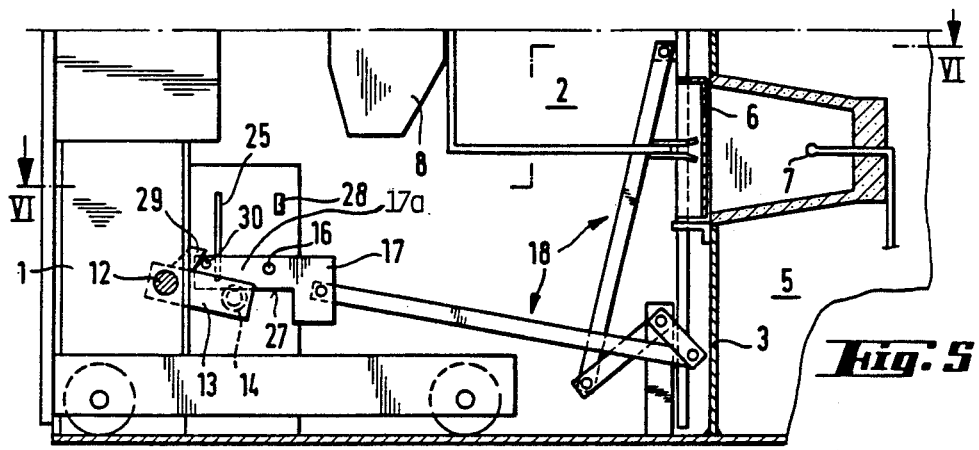
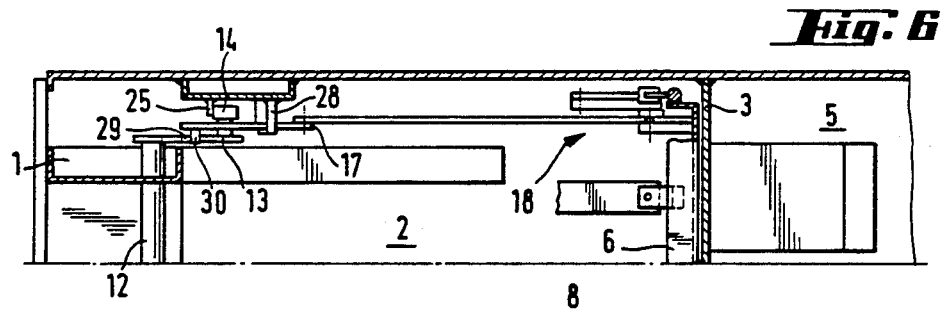
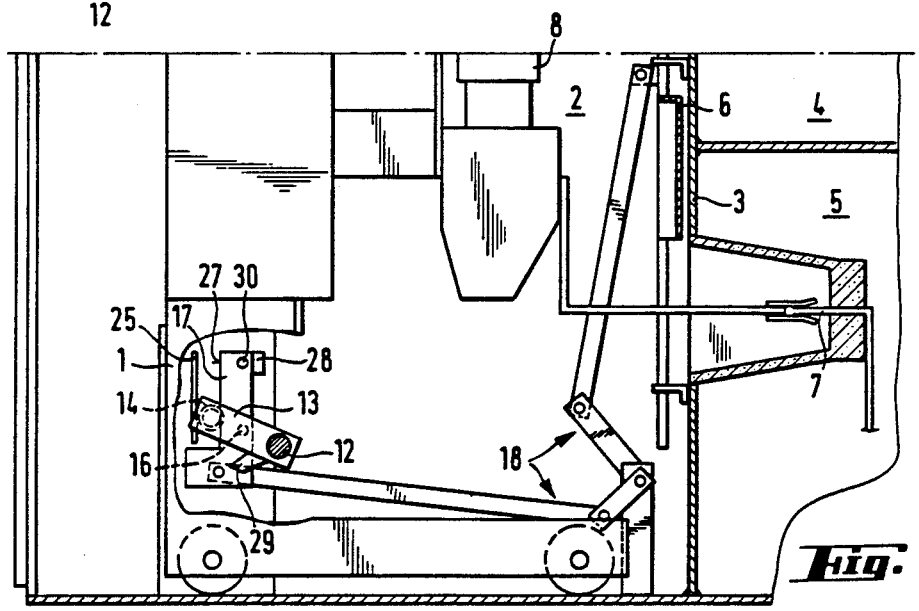

PARTITIONED SWITCHING PANEL WITH INSERTABLE SWITCHING CARRIAGE AND ADJUSTABLE SHUTTER MECHANISM

BACKGROUND OF THE INVENTION

The present invention relates to a partitioned switching panel. More particularly, the present invention relates to partitioned switching panel of the type which includes a power switch which is mounted on a carriage or the like so that the power switch can be moved toward and away from stationary switch contacts disposed behind a partition of the panel and accessible through openings which are closed by displaceable shutters when the power switch is in the circuit breaking position, and wherein the opening and closing mechanism for the shutters comes into engagement with the forward drive of the power switch carriage and is actuated by same when the power switch carriage is in the circuit breaking position.

A partitioned switching panel of the above type is disclosed in Swiss Patent No. 558,600, issued Dec. 15th, 1974 and comprises a lever which is rotationally mounted on the switching panel and is provided with a cam follower as well as a crank fixed to the housing as part of the forward drive, and with a pivot plate rotationally mounted in the housing as the connection member for the opening and closing mechanism of the shutters. The parts are configured in such a way that actuation of the forward drive from the circuit breaking position, with the shutters closed, causes only part of the switch closing path to be traversed. Subsequently, when the switching carriage is stopped, the shutters are opened and then the second part of the path is traversed until the operating position of the switch is reached.

This sequence of movements has the drawback that the switching panel has a relatively large depth and thus takes up a large base surface in the plant. Additionally it requires a crank which has several bends that are expensive in manufacture and inevitably must cooperate with a relatively long lever, since the movement of the switching carriage between the circuit breaking and the operating position causes the cam follower of the lever to be unable to move through the crank in both directions, due to the bends in the crank. As a further drawback, this long lever arm transmits high torques to the forward drive, primarily during movement of the power switch into the stationary circuit breaker contacts, but also as a reaction to high shortcircuit currents flowing through the power switch.

A partitioned switching panel of the above type is also disclosed in U.S. Pat. No. 2,673,260 issued Mar. 2nd, 1954 wherein the problem of large dimensions of the above discussed references is generally overcome in that the forward drive for the carriage and the opening and closing mechanism cooperate with one another in a manner such that the opening of the shutters is completed when the forward movement of the carriage from the circuit breaking position to the connected position begins. According to this patent, this is achieved by providing the drive mechanism with an orbital cam follower which cooperates with a relatively complex camming surface formed in a specially formed hooked racking cam plate in order to provide for lost motion in the racking or movement of the carriage during the time the shutters are opened.

SUMMARY OF THE INVENTION

It is an object of the present invention to provide a partitioned switching panel of the general type described above in which the control arrangement, whereby the forward drive and the mechanism for opening and closing the shutters cooperate with one such that the opening of the shutters is completed when the forward movement of the switching carriage begins, is realized in a simplified manner using only simple noncomplex parts.

It is a further object of the invention to avoid high torques for the forward or carriage drive, as they are developed, for example, during movement into the stationary circuit breaker contacts, so that, in remote controlled switching systems, the opening and closing of the power switch can be performed with a low power motor drive.

The above objects are generally achieved according to the present invention in that in a partitioned switching panel including a power switch provided with first switch contacts and mounted on a carriage which is movable toward and away from cooperating stationary second switch contacts disposed behind a partition of the switching panel and accessible via openings in the partition, displaceable shutters mounted on the partitions for closing the openings when the first and second contacts are disconnected, and means for moving the carriage between a circuit breaking position wherein the first and second switch contacts are disconnected and an operating position wherein the first and second switch contacts are connected and for opening and closing the shutters when the carriage is in the circuit breaking position, and such that the opening of the shutters is completed when movement of the carriage from the circuit breaking position toward the operating position begins; the means for moving and for opening and closing comprises: a driven output shaft rotatably mounted on the carriage; an output lever having one end connected to the shaft for rotation therewith and having a cam follower mounted on its other end; a linear camming track fixedly mounted on the panel at a position to cooperate with the cam follower upon rotation of the shaft such that initial movement of the cam follower along an initial section of the track when the carriage is at rest in the circuit breaking position does not result in movement of the carriage and continued movement of the cam follower along the remaining portion of the track causes movement of the carriage toward the operating position and the cam follower to traverse the track twice in opposite directions during such movement of the carriage to the operating position; a camming lever, having first and second arms rotatably mounted on the panel wall adjacent the camming track such that one arm of the camming lever is engaged and pivoted by the cam follower during its initial movement along the initial camming track section; and mechanical linkage means, connected to the second arm of the camming lever, for opening the shutters in response to the one arm being engaged and moved by the cam follower.

According to a feature of the invention, the linear camming track is mounted on the panel such that its longitudinal axis is oriented parallel to the partition and perpendicular to a plane containing the axis of rotation of the output shaft and perpendicular to the partition, and the output lever traverses an angle of rotation of approximately 180° between the circuit breaking and operating positions of the carriage and, when the carriage is in the operating position, reaches a final position in the camming track which lies shortly before the dead center position of the output lever.

As a result of the utilization of a straight, unbent camming track which permits the output lever of the forward carriage drive to reach a final position in the camming track which lies shortly before its dead center position, a low power motor drive can be used to rotate or drive the output shaft to cause the opening and closing of the switch contacts. In the case of a short circuit, this also assures that only slight reaction forces from the power switch will act on the forward drive.

According to the preferred embodiment of the invention, the linear or straight camming track is realized by a U-shaped channel in which the cam follower moves and is guided by both edges of the U-shaped channel.

According to an advantageous further embodiment of the invention, a particularly simple configuration of the camming track or guide for the cam follower is realized, in that instead of a U-shaped channel, a unilaterally disposed linear web is provided as an abutment to support or guide the cam follower during movement of the carriage out of the circuit breaking position, i.e, toward the operating position, and a straight edge is provided on the camming lever for the opening and closing mechanism for the shutters which, when the shutters are in the open position, supports and guides the cam follower during movement of the carriage into, i.e., out of the operating position.

In the preferred embodiment of the invention, the driven shaft is horizontally mounted on the carriage. However, since the coacting parts of the carriage drive and of the opening and closing mechanism for the shutters have only a very narrow total width, they can be accommodated, in an advantageous manner, underneath the switching carriage on the base surface or wall of the switching panel if the forward drive has a vertical shaft. The switching panels equipped in this manner then also have minimum width dimensions.

BRIEF DESCRIPTION OF THE DRAWINGS

FIG. 5 is a partial side view similar to FIG. 1 showing a modified guide according to the invention for the forward drive.

FIG. 6 is a partial sectional plan view in the direction VI—VI of FIG. 5.

FIG. 7 shows the lower portion of the side view similar to FIG. 4 with the modified guide for the forward drive.

DETAILED DESCRIPTION OF THE PREFERRED EMBODIMENTS

Referring now to FIGS. 1-4 there is shown a partitioned switching panel which, in a conventional manner includes a switching carriage 1 having a power switch 8 with its electrical contacts 9 mounted thereon and positioned in a power switch chamber 2 of the panel with the door 2' for the chamber 2 closed.

Figure 1:
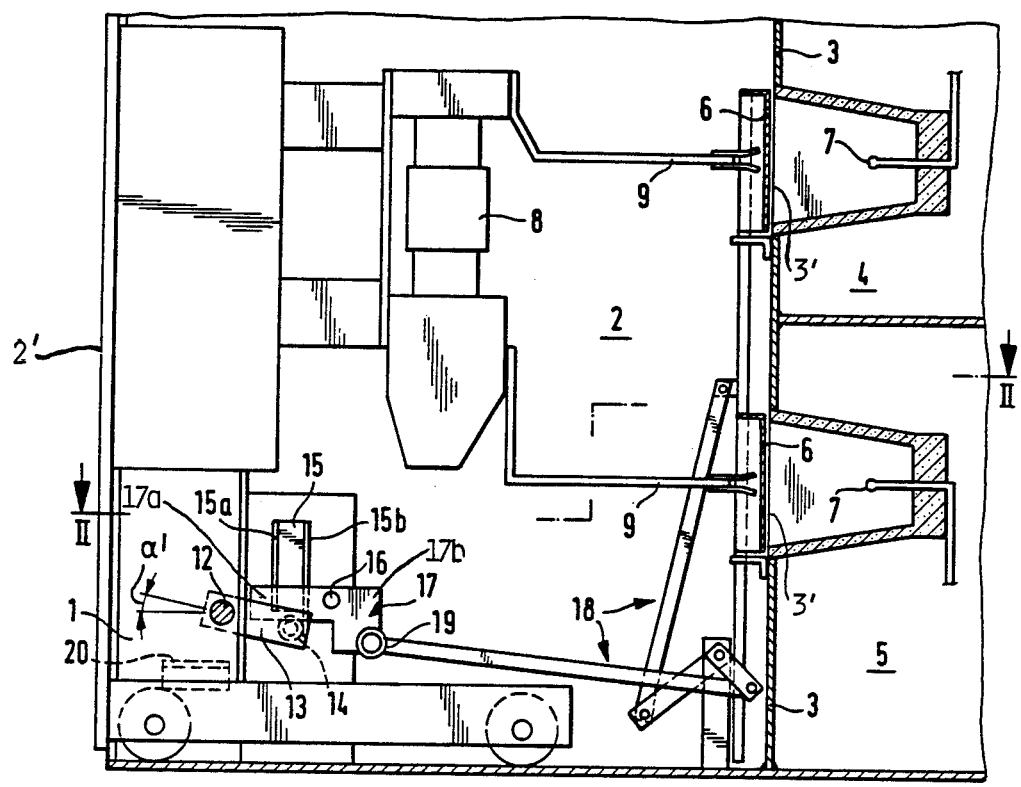
FIG. 1 is a simplified side view of one embodiment of a partitioned switching panel according to the invention with the side sections of the panel and switching carriage being omitted, with the switching carriage being shown in the circuit breaking position, and with the shutters closed.
Figure 2:
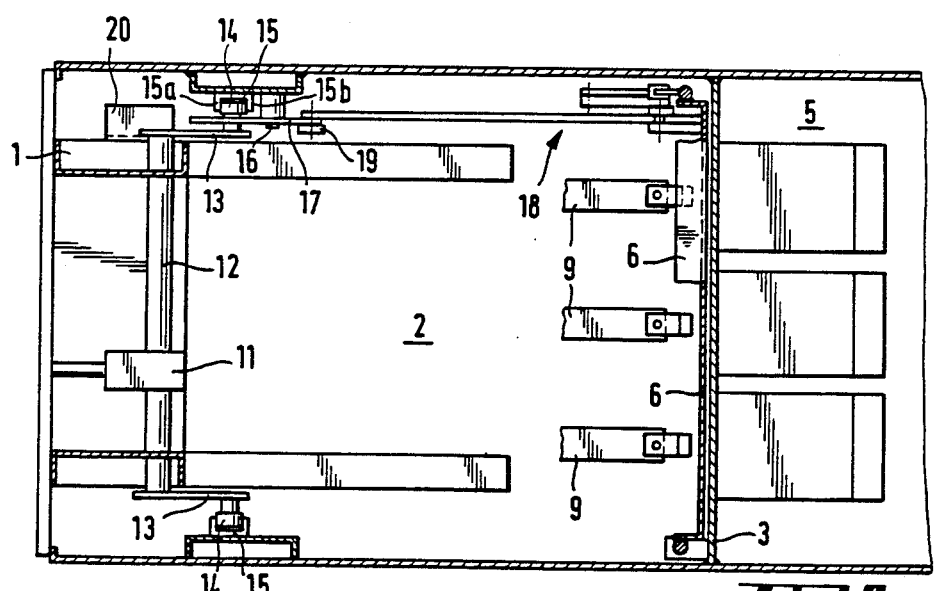
FIG. 2 is a sectional plan view taken along the line II—II of FIG. 1.

The power switch chamber 2 is separated by a vertical partition 3 from a bus bar chamber 4 and from a terminal chamber 5 in which respective stationary contacts 7 are disposed. To provide access to the stationary contacts 7, the partition 3 is provided with respective openings 3' which are closed by moveable shutters 6 mounted on the partition 3 when the carriage 1 is in the circuit breaking position as shown in FIGS. 1 and 2. By means of a carriage drive, the carriage 2 is moveable between the rest circuit breaking position of FIGS. 1 and 2, wherein the contacts 7 and 9 are disconnected, and a switch operating position as shown in FIG. 4, wherein the contacts 7 and 9 are connected.

The carriage drive includes a reversible drive unit 11 which is connected to and drives a shaft 12 rotatably mounted on the carriage 1, preferably in a horizontal positioned as shown, so that its longitudinal axis is parallel to the partition 3. Connected to at least one end of the drive shaft 12 for rotation therewith (and preferably to both ends as shown) is a straight output lever 13 having a cam follower 14, e.g., a roller, mounted thereon and positioned so that it cooperates with a linear camming track or guide 15 fixedly mounted in the chamber 2, e.g. on a sidewall of the switching panel. As shown, the camming track 15 is U-shaped with two arms or webs 15a and 15b which define a channel therebetween for guiding the cam follower 14. The camming track 15 is mounted in the panel so that its longitudinal axis is parallel to the partition 3 and perpendicular to a plane perpendicular to the partition 3 and containing the rotation axis of the shaft 12, and so that it is disposed between the shaft 12 and the partition 3 when the carriage is in the circuit breaking position (FIG. 1). The inward web 15b, i.e, the web closest to the partition 3, of the camming track 15 is longer than the other arm 15a and has its leading end extending beyond the leading end of the arm 15a so that its inward or control surface forms an abutment for the cam follower 14 to limit the forward position of the switch carriage 1 when it is initially pushed into the chamber 2 via the open door 2' with the output lever 1 in its rest position as shown in FIG. 1. In this rest position of the lever 13 for the circuit breaking position of the carriage 1, the longitudinal axis of the lever 13 encloses an acute angle $\alpha'$ with the normal or line perpendicular to the longitudinal axis of the camming track 15 and passing through the driven shaft 12, with this angle preceding or leading the dead center position of the lever 13 in the direction of rotation.

In order to open and close the shutters 6 in response to movement of the cam follower 14, a camming lever 17 is pivotally mounted on the panel wall adjacent the camming track 15 for rotation about a pivot axis 16 which is parallel to the longitudinal axis of shaft 12 and is disposed between the camming track 15 and the partition 3. As shown the camming lever 17 is generally L-shaped and has a first arm 17a which is disposed in the path of movement of the cam follower 14 when it is in its rest position as shown in FIG. 1 and which is engaged by the cam follower 14 to pivot the camming lever 17 upon initial movement of the cam follower from its rest position. The other arm 17b of the camming lever is connected to an opening and closing linkage mechanism 18 which is connected to the shutters 6 and which causes the shutters 6 to be moved upon pivotal movement of the camming lever 17.

Figure 3:
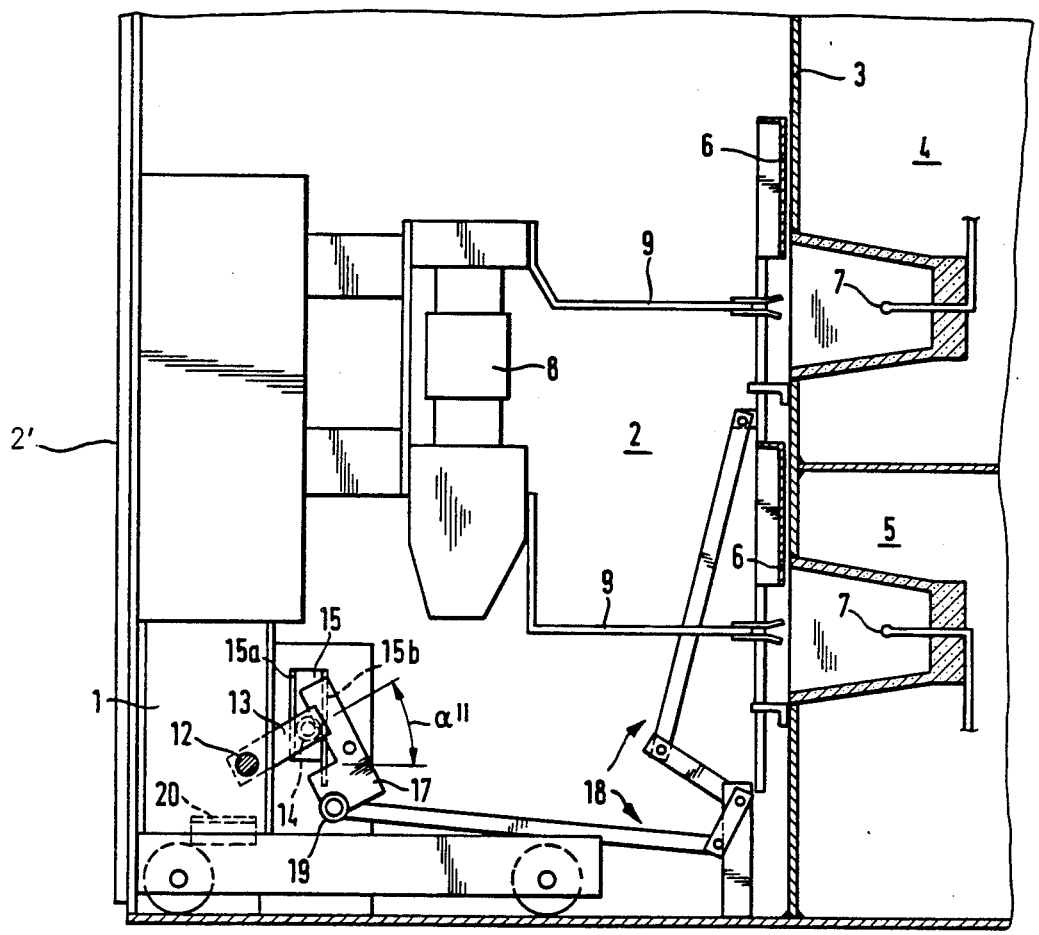
FIG. 3 is a side view similar to FIG. 1 but with the shutters in the open position.
Figure 4:
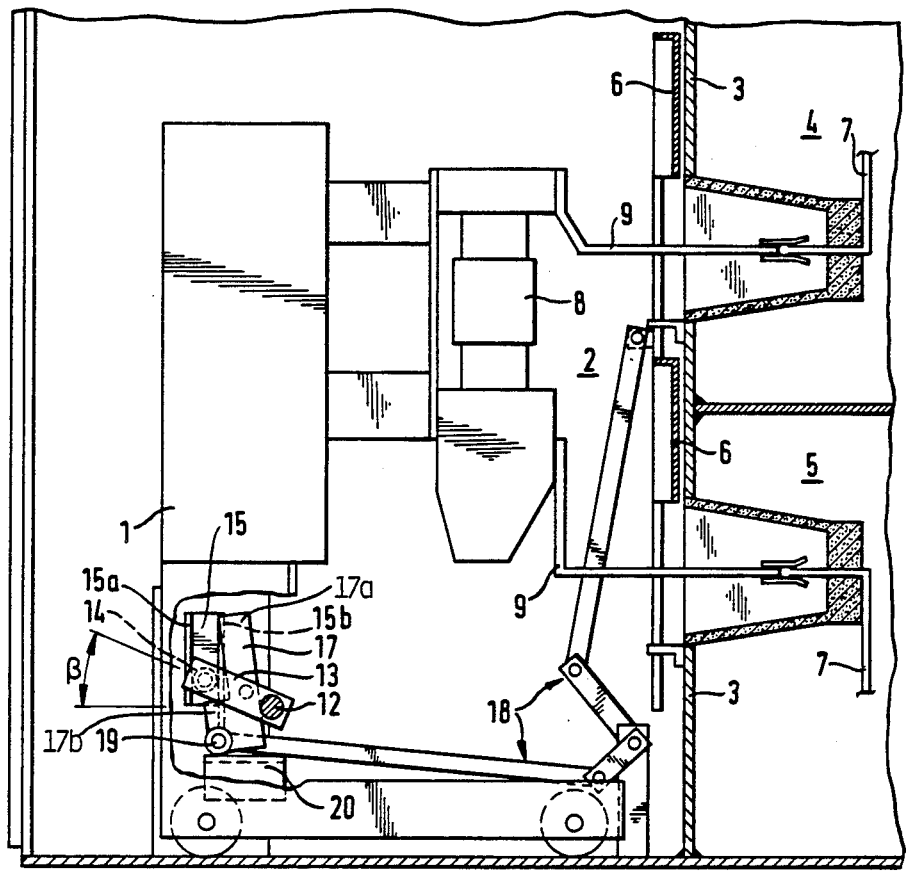
FIG. 4 is a side view similar to FIG. 1, with the switching carriage being in the operating position and the shutters open.

In operation of the arrangement of FIGS. 1-4, in order to move the carriage 1 from the circuit breaking position of FIGS. 1 and 2 to the operating position of FIG. 4, the drive 11 is energized to cause the cam follower 14 to move from the position shown in FIG. 1 in a counter clockwise direction.

As can be seen in FIG. 3, with the position of switching carriage 1 unchanged, the camming lever 17 has been pivoted sufficiently so that the shutters 6 have taken on their open position. Output lever 13 of the carriage drive has now rotated sufficiently so that it now encloses an acute angle $\alpha''$ with the normal to the longitudinal axis of the camming track 15 which passes through the shaft 12. Angles $\alpha'$ and $\alpha''$ are approximately equal, and their sum, $\alpha'+\alpha''$, constitutes the portion of the rotary movement of the output lever 13 which is ineffective for the forward movement, i.e., provides for lost motion.

Continued rotation of the output lever 13 in the counter clockwise direction causes the carriage 1 to move into the operating position as shown in FIG. 4, i.e. the galvanic connection between the switch contacts 9 of the power switch 8 and stationary contacts 7 has been established. Between the positions shown in FIGS. 3 and 4, i.e. in the section in which forward movement of the carriage 1 takes place, the cam follower 14 has passed through the camming track 15 twice, i.e., once in each direction. During the travel of the carriage 1, the output lever 13 has traversed a total angle of about 180° and, in the operating position shown in FIG. 4, encloses a relatively small angle $\beta$ with the normal to the longitudinal axis of the camming track 14 passing through the shaft 12.

In order to support the camming lever 17 when it has been pivoted sufficiently to open the shutters 6 and out of the path of movement of the cam follower 14 in order to maintain the shutters 6 in the open position, a roller 19 provided on the arm 17b is engaged and supported by a bracket 20 disposed on the carriage 1 when the carriage 1 has moved from its circuit breaking position (see FIG. 4).

Movement of the carriage 1 from the operation position of FIG. 4 to the circuit breaking position of FIG. 1 and the closing of shutters 6 are achieved by rotating the output lever 13 in the clockwise direction until the output lever 13 returns to its rest position as shown in FIG. 1.

With a kinematic arrangement as described above with respect to FIGS. 1-4, relatively small torques are required to close the switch contacts 7, 9, which is a favorable prerequisite for operation of the switching carriage 1 by means of electrical motor drives for remote controlled switching systems. Moreover, the forces acting on the power switch 8 in the circuit breaking direction in the case of a short circuit also produce only small reaction moments on the forward drive.

FIGS. 5, 6 and 7 show a modified embodiment of the mechanical system in which the previously described functions are performed with simplified parts. This simplification relates primarily to the camming track or guide for the cam follower 14 of the carriage drive, while the opening and closing arrangement for the shutters remains essentially unchanged.

According to this embodiment as shown in FIGS. 5-7, instead of the U-shaped track or guide 15 of FIGS. 1-4, only one linear web 25 is provided on the panel wall, with this web 25 forming an abutment or cam surface for guiding the cam follower 14 in the switch closing direction, i.e., during movement of the carriage toward the operating position. The other edge of the camming track or guide for the cam follower 14, particularly to provide support or an abutment for same in the switch opening direction, i.e, in the direction toward the circuit breaking position, is provided by the linear control edge 27 of the arm 17a of the camming lever 17. As can be seen in FIG. 7, when the shutters 6 are in the open position, this control edge 27 assumes a position wherein it is substantially parallel to the web 25. To limit the rotation of the camming lever 17 when the shutters 6 are open and so as to cause the control edge 27 to maintain the desired illustrated position of FIG. 7, a fixed abutment 28 is provided on the switching panel in the path of rotation of the camming lever 17. Finally, a tongue 29 disposed on the output lever 13 engages a further abutment 30 provided on the camming lever 17 so that when the carriage is in its final at rest circuit breaking position (FIG. 5), further movement of the camming lever 17 and forward movement of the carriage 1 are prevented as long as the carriage drive is not actuated. The engagement of the tongue 29 and abutment 30 also serves the purpose of limiting the forward movement of the carriage 1 when it is first inserted into the chamber 2 and thus delimits or defines the circuit breaking position of FIG. 5.

Figure 8:
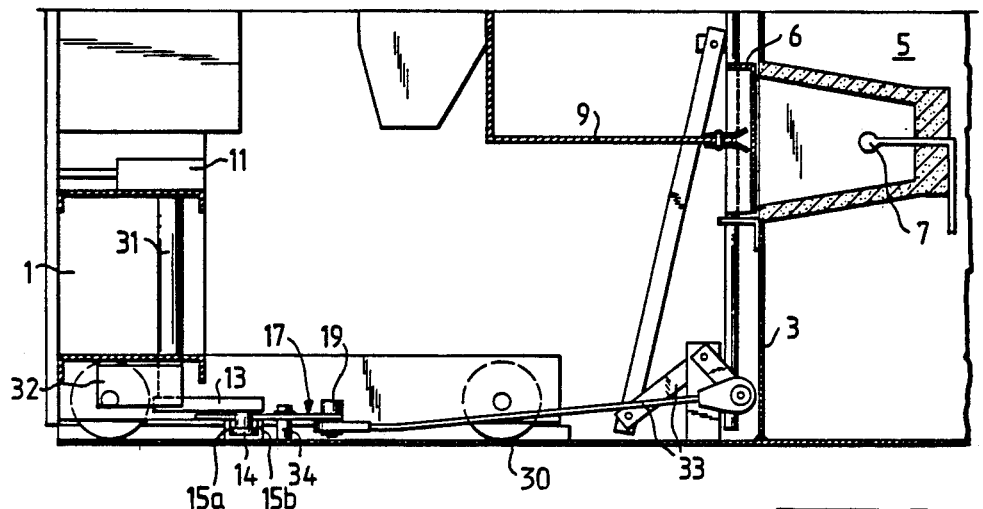
FIG. 8 is a partial side view of the lower portion of a partitioned switching panel similar to FIG. 1, but with a modified advancing or forward drive provided with a vertical driven shaft, in the direction VIII—VIII of FIG. 9.
Figure 9:
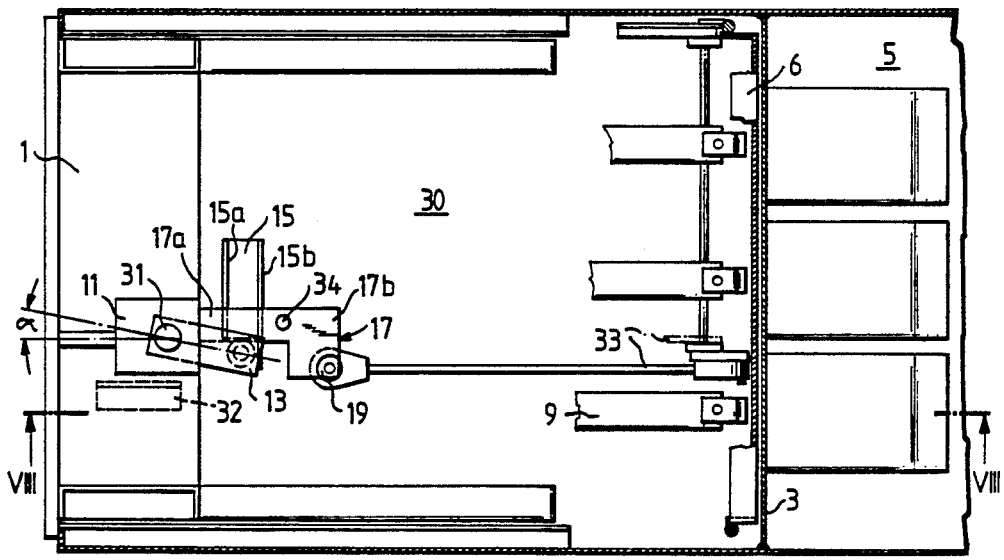
FIG. 9 is a sectional top plan view of a partitioned switching panel showing the modified forward drive of FIG. 8.

FIGS. 8 and 9 show a modification of the invention in which the driven output shaft 31 of the advancing drive unit 11 is vertically mounted on the switching carriage 1. The U-shaped camming track 15 is now fastened on the sheet metal bottom surface or wall 30 of the switching panel, as is the pivot axis 34 of the camming lever 17. The interaction of parts 15 and 17 with the output lever 13 connected to the lower end of output shaft 31 takes place in the same manner as already described in connection with the horizontal drive arrangement of FIGS. 1 to 4. An opening and closing linkage mechanism 33 for shutters 6, in the form of a spatial rod assembly similar to the mechanism 18 of FIGS. 1-4, has one rod or arm coupled to arm 17b of camming lever 17 and, as shown, extends adjacent the bottom wall 30 toward the partition 3. During travel of the switching carriage 1 into the operating position, console or bracket 32, which is fastened to switching carriage 1, in cooperation with roller 19 mounted on the arm 17b of camming lever 17, holds shutter 6 in the open position in a manner similar to that described with respect to bracket 20 of FIG. 4.

The present disclosure relates to the subject matter disclosed in Federal Republic of Germany Application Pat. No. P 35 42 979.8 of Dec. 5th, 1985, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a partitioned switching panel including a power switch provided with first switch contacts and mounted on a carriage which is movable toward and away from cooperating stationary second switch contacts disposed behind a partition of the switching panel and accessible via openings in said partition, displaceable shutters mounted on said partitions for closing said openings when said first and second contacts are disconnected, and means for moving said carriage between a circuit breaking position wherein said first and second switch contacts are disconnected and an operating position wherein said first and second switch contacts are connected and for opening and closing said shutters when said carriage is in said circuit breaking position and such that the opening of said shutters is completed when movement of said carriage from said circuit breaking position toward said operating position begins; the improvement wherein said means for moving and for opening and closing comprises: a driven output shaft rotatably mounted on said carriage; an output lever having one end connected to said shaft for rotation therewith and having a cam follower mounted on its other end; a linear camming track fixedly mounted on said panel at a position to cooperate with said cam follower upon rotation of said shaft and such that initial movement along an initial section of said camming track when said carriage is at rest in said circuit breaking position does not result in movement of said carriage and continued movement of said cam follower along the remaining portion of said camming track causes movement of said carriage toward said operating position and said cam follower to traverse said track twice in opposite directions during such movement of said carriage to said operating position; a camming lever having first and second arms, said camming lever being rotatably mounted on said panel adjacent said camming track such that said first arm of said camming lever is engaged and pivoted by said cam follower during its said initial movement along said initial camming track section; and mechanical linkage means, connected to said second arm of said camming lever, for opening said shutters in response to said first arm being engaged and moved by said cam follower.

2. A switching panel as defined in claim 1 wherein: said linear camming track is mounted on said panel such that its longitudinal axis is oriented parallel to said partition and perpendicular to a plane containing the rotation axis of said output shaft and perpendicular to said partition; and said output lever encloses an acute angle with a line perpendicular to said longitudinal axis of said camming track, with said angle preceding the dead center position of said output lever in the direction of its said initial movement, when said carriage is in said circuit breaking position, and said output lever is in its initial rest position.

3. A switching panel as defined in claim 2 wherein said output lever traverses an angle of rotation of approximately 180° between said circuit breaking and said operating positions of said carriage, and reaches a final position in said camming track which lies shortly before the dead center position of said output lever when said carriage is in said operating position.

4. A switching panel as defined in claim 3, wherein the angle of rotation traversed by said cam follower during its movement along said path which is ineffective to cause movement of said carriage is equal to approximately twice said acute angle.

5. A switching panel as defined in claim 4, wherein said camming track comprises two spaced parallel straight webs which define a channel therebetween in which said cam follower moves.

6. A switching panel as defined in claim 5 wherein said two webs are of unequal length with the leading edge of the one of said webs which is closest to said partition extending sufficiently beyond said plane of said driven shaft so that said one web forms a forward abutment for said cam follower when said output lever is in said rest position so as to limit the forward position of said carriage when it is initially moved from an external position to said circuit breaking position within said panel.

7. A switching panel as defined in claim 5, further comprising means, attached to said carriage, for engaging and supporting said second arm of said camming lever when it has been pivoted into a position to cause opening of said shutters, and for preventing further movement of said camming lever while said cam follower is in said portion of said camming track which is effective to cause movement of said carriage.

8. A switching panel as defined in claim 4 wherein: the pivot axis of said camming lever is parallel to the longitudinal axis of said shaft; the control edge of said first arm of said camming lever which is engaged by said cam follower is a straight elongated edge; and said camming track is formed by a single linear web disposed on said panel and said control edge of said camming lever which, when said shutters are in the open position, has been pivoted into a position so that it extends substantially parallel to said web.

9. A switching panel a defined in claim 8 further comprising an abutment disposed on said panel for limiting the rotary movement of said camming lever in the open position of said shutters to cause said control edge of said camming lever to extend substantially parallel to said web.

10. A switching panel as defined in claim 9 further comprising respective cooperating means, disposed on said camming lever and on said output lever, for preventing movement of said carriage toward said partition when said carriage is in said circuit breaking position and said output lever is in said rest position.

11. A switching panel as defined in claim 4 wherein the pivot axis of said camming lever is disposed between said camming track and said partition when said carriage is at rest in said circuit breaking position.

12. A switching panel as defined in claim 1 wherein: said driven output shaft is horizontally mounted on said carriage; said camming track and said camming lever are disposed on one vertical side wall of said panel; and said mechanical linkage means includes an arm connected to said camming lever and extending toward said partition adjacent only said one side wall of said panel.

13. A switching panel as defined in claim 1 wherein said driven output shaft is vertically mounted on said carriage; said camming track and said camming lever are disposed on the base surface of said panel; and said mechanical linkage means includes an arm connected to said camming lever and extending toward said partition adjacent said base surface of said panel.

* * * * *